United States Patent [19]

Isheim

[11] 4,248,164
[45] * Feb. 3, 1981

[54] SLUDGE DRYING SYSTEM WITH SAND RECYCLE

[75] Inventor: Maynard C. Isheim, Menlo Park, Calif.

[73] Assignee: Envirotech Corporation, Menlo Park, Calif.

[*] Notice: The portion of the term of this patent subsequent to May 8, 1996, has been disclaimed.

[21] Appl. No.: 18,389

[22] Filed: Mar. 9, 1979

Related U.S. Application Data

[63] Continuation-in-part of Ser. No. 895,684, Apr. 12, 1978, Pat. No. 4,153,411.

[51] Int. Cl.³ ............................ F23G 5/04; F27B 9/22
[52] U.S. Cl. ..................................... 110/225; 110/247; 110/346; 432/139
[58] Field of Search .................... 110/221, 224–228, 110/247, 346; 432/18, 23, 48, 133, 139, 144

[56] References Cited

U.S. PATENT DOCUMENTS

| | | | |
|---|---|---|---|
| 2,147,151 | 2/1939 | Connolly | 110/225 |
| 2,754,105 | 7/1956 | Pistorius et al. | 432/28 X |
| 3,411,465 | 11/1968 | Shirai | 110/227 |
| 3,625,165 | 12/1971 | Ishigaki | 110/227 |
| 3,954,069 | 5/1976 | Loken | 110/221 |
| 3,958,920 | 5/1976 | Anderson | 110/225 X |
| 3,968,756 | 7/1976 | Yamada | 110/225 |
| 4,154,643 | 5/1979 | Cook et al. | 110/247 X |

*Primary Examiner*—John Petrakes
*Attorney, Agent, or Firm*—Hal J. Bohner; Robert E. Krebs

[57] ABSTRACT

A process and system to dry wet sewage sludge with hot sand and to burn the dried sludge. The sand is heated in a heating device by burning dried sludge, and the hot sand is mixed with wet sludge in a drying device. Thereby moisture is driven from the wet sludge to dry it. The dried sludge and sand are separated, and the sand returned to the heating device while the dried sludge is burned to heat the sand.

9 Claims, 4 Drawing Figures

SLUDGE DRYING SYSTEM WITH SAND RECYCLE

RELATED APPLICATION

This application is a continuation-in-part of U.S. patent application Ser. No. 895,684 filed Apr. 12, 1978, now U.S. Pat. No. 4,153,411.

BACKGROUND OF THE INVENTION

1. Field of the Invention

This invention relates to the drying and burning of waste materials such as sewage sludge.

2. State of the Art

Conventional wastewater treatment processes remove pollutants from the wastewater and generate slurries of the removed pollutants. These slurries are generally known as sludge, which contains organic materials as well as a high percentage of water. Disposal of the sludge is accomplished by known methods, and one such method includes dewatering the sludge by filtration and incineration of the dewatered sludge.

It is generally recognized that filtration of sludge removes only a fraction of the water, and substantial quantities of water remain with the sludge even after filtration. Therefore, it is desirable to remove additional water from the sludge prior to incineration so that it is not necessary to heat substantial quantities of water in the incineration step.

One conventional process for removing additional water from filtered sludge includes heating the sludge prior to incineration. In a dryer, the sludge is contacted with hot combustion gases from the incineration step so that the sludge is heated and water is driven off as vapor. When the sludge is heated, malodorous gases as well as water evolve from the drying sludge and they are carried from the dryer by the combustion gases. These gases are then passed through a condensor wherein the water vapor condenses and is disposed of, and the dry, malodorous gas is returned to the incinerator to be burned.

It should be appreciated that a gas has a relatively low heat capacity, and therefore large quantities of the combustion gas must be contacted with the sludge in order to effectively heat and dry it. Moreover, a large dryer and condenser are also necessary to handle the large volumes of gas.

OBJECTS OF THE INVENTION

An object of the present invention is to provide a process and system to dry sludge and like materials while minimizing the quantity of gases which must be treated. Another object is to provide a process and system whereby the quantity of fuel required to dry the sludge is minimized.

Further objects and advantages of the present invention can be readily ascertained by reference to the following description and drawings, which are offered by way of example only and not in limitation of the invention, the scope of which is defined by the appended claims and by equivalents to the structure, materials, and acts set forth hereinafter.

DETAILED DESCRIPTION OF THE PREFERRED EMBODIMENT

Figure 1:
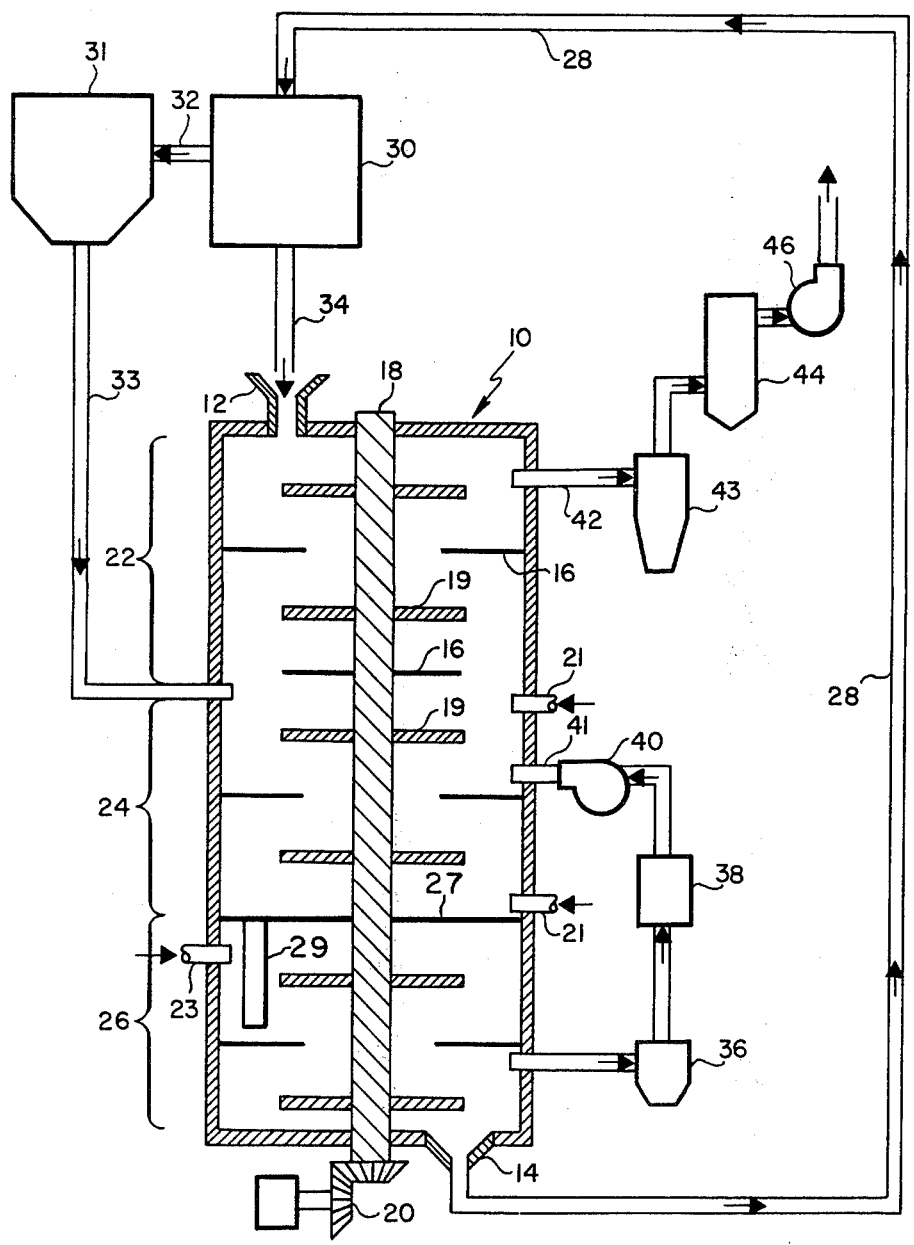
FIG. 1 is a schematic representation of one embodiment of the present system.

The presently preferred embodiment shown in FIG. 1 includes a conventional multiple hearth furnace 10. This multiple hearth furnace includes a substantially vertically disposed, cylindrical vessel having an inlet 12 at its upper end and an outlet 14 at the lower end. A plurality of hearths 16 are located within the vessel perpendicular to its axis, and spaced apart from one another. A center column 18 is rotatably disposed in the center of the furnace 10 parallel to the axis of the furnace, and a plurality of rabble arms 19 are affixed to the center column parallel to the hearths 16. Drive means 20 is coupled to the lower end of the center column 18 to cause the center column to rotate so that the rabble arms 19 urge material to travel across the hearths 16. The hearths 16 are constructed so that material flows downward through the furnace in a generally serpentine path.

A plurality of burners 21 are connected through the sides of the furnace 10. The burners 21 are coupled to sources of pressurized air and of fuel, not shown, to provide heat to the furnace. An inlet conduit 23 is coupled to the lower part of the furnace to introduce wet sludge thereinto.

For the purpose of this description the furnace 10 should be understood to include an upper zone 22 wherein sand is heated, a middle zone 24 wherein dry sludge is burned, and a lower zone 26 wherein wet sludge is dried. Each of these zones comprises one or more hearth spaces. Although each of the zones is illustrated to encompass a particular number of hearth spaces, various operating conditions can dictate the use of different numbers of hearth spaces for a particular zone. The upper zone 22 and middle zone 24 are in gas flow communication, in that rising gases flow upward around the hearths 16. However, the hearth 27 separating the middle zone 24 from the lower zone 26 extends across the furnace to prevent the upward flow of gas. A conduit 29 is connected between the hearth 27 to extend downward almost to the next lower hearth 16 thereby providing a means for sludge to flow downward. The conduit 29 is arranged so that the sludge normally blocks the lower end of the conduit but is periodically raked away by the rabble arms 19 to permit more sludge to flow downward. Thereby no substantial upward flow of gas is permitted through conduit 29. This construction of conduit 29 is conventional, and other conventional means can also be utilized to permit downward flow of sludge while preventing upward flow of substantial quantities of gas.

It should be understood that in operation the sand and wet sludge are mixed in the multiple hearth furnace 10 and the sludge is dried. This will be discussed below. After the sludge is dried in the furnace 10, the mixture of sand and sludge is removed via line 28 and transferred to classifier 30. The classifier 30 is a known device such as a screening device, an air classifier or a cyclone centrifuge, which utilize the difference in particle sizes or in specific gravity between two materials to accomplish separation of the materials. From the classifier 30 the sludge is transferred to a sludge storage container 31 via line 32, and the sand is returned to the furnace 10 via line 34. From the storage container 31 dry sludge is conveyed to the furnace by line 33.

Coupled to the lower zone 26 is a cyclone 36 for receiving gas and water vapor evolved from the wet sludge along with some light sludge particles carried by the gas. The sludge particles removed from the gas stream by the cyclone 36 can be transferred to the sludge storage container 31 or disposed of. The gas from the cyclone 36 is transferred to a condenser 38 wherein a substantial part of the water vapor is removed from the gas, for example, by spraying cold water through the condenser to cause condensation of the water vapor. After the water vapor has been removed, the substantially dry gas is conveyed via blower 40 and line 41 to the middle zone 24 to be burned therein.

A line 42 is coupled to the upper end of the furnace to receive the products of combustion generated in the furnace 10 along with some light particles, and convey them to a cyclone 43 wherein the particles are removed and disposed of. The gases leaving the cyclone 43 are transferred to a conventional scrubber 44. In the scrubber 44 a spray of water or other scrubbing liquid is directed into the gas stream to collect particles which were not removed by the cyclone 43. Alternatively a conventional dry-type particle collection means such as a bag house can be employed. A blower 46 or the like is connected to the gas outlet of the scrubber 44 to pull the gas through the system.

In operation of the present system sand is continuously fed into the upper zone 22, and fuel such as oil or gas is burned in the burners 21. The rabble arms 19 are rotated so that the sand is raked over the hearths 16 and cascades through the hot gas rising in the furnace. Thus the sand is heated as it travels to the middle zone 24. In practice the sand is heated to about 800°-1200° F. before it reaches the middle zone 24.

Dry sludge is introduced into the middle zone 24 via line 33 to burn thereby heating the sand. Thereafter a mixture of hot sand and the ash from the burned sludge flows to the lower zone 26 via conduit 29.

While the hot sand and sludge flow into the lower zone 26, wet sludge is introduced via line 23. The rabble arms 19 mix the sludge and sand, and the sand gives up its heat to evaporate a substantial part of the water from the sludge. In practice the wet sludge introduced into the furnace has a high moisture content, for example, about 75% water. However, wet sludge having more or less water by weight can also be treated. The sludge leaving the furnace via port 14 has a low moisture content, for example, about 5% water and has a temperature of, say 200° F. However, it should be recognized that the moisture content and temperature of the dried sludge can be varied depending upon various parameters such as the time of contact between the sand and sludge and the ratio of sand to sludge.

A small amount of ambient, purge air is drawn by blower 40 through the furnace 10 to convey the gases from the drying sludge to the middle zone 24. It should be appreciated that these gases contain a substantial quantity of water vapor and also malodrous gases from the sludge. In the condenser 38 a substantial part of the water vapor is condensed so that it can be disposed of, and the malodorous gases, which are combustible, are transferred to the middle zone 24 where they are burned.

The dry sludge and sand mixture is removed from the furnace 10 and conveyed to the classifier 30. The sand used in the present process preferably has a grain size substantially different from the dry sludge particles, and the classifier can separate particles on the basis of size or specific gravity to effect a substantially complete separation of the sludge from the sand. The sand from the classifier 30 is transferred to the furnace 10 and the sludge is transferred to the storage container 31.

From the storage container 31 the sludge is sent to the furnace 10 to be burned. It should be understood that the sludge can be mixed with a fluid fuel for burning. For example, it can be mixed with oil or gas or waste grease. Alternatively, the sludge can be burned uncombined with any fluid fuel.

If all of the sludge is not burned in the middle zone 24, any remaining sludge can be used as humus or fertilizer. For example, my calculations show that when sludge which is about 78% water, with the non-water constituents being about 65% volatile material, is introduced into the upper zone 22 for drying and all the dry sludge is burned in the furnace, it is not necessary to burn additional fuel to heat the sand. In this circumstance the combustion of the sludge is termed autogenous. Furthermore, if the sludge contains less than about 78% moisture, all the dry sludge need not be burned, and dry sludge is available to be used as humus or fertilizer. If fluid fuel is burned with the sludge, larger quantities of the dry sludge will be available as humus or fertilizer.

Generally, unless the temperature is in excess of about 1000° F. the malodorous gases introduced through line 41 are not substantially burned and deodorized. Therefore, the temperature in the middle zone 24 is generally maintained above 1000° F. The system is preferably designed so that the temperature near line 42 is substantially lower than 1000° F., and the gas leaving the furnace 10 via line 42 is at a relatively low temperature, say about 200° F. Thus it can be appreciated that the sand and malodorous gases can be heated to relatively high temperature while insuring that the gas discharged from the furnace 10 need not be a high temperature. In other words, the majority of the heat from the burning sludge is usefully transferred to the sand and combustion of the malodorous gases.

Figure 2:
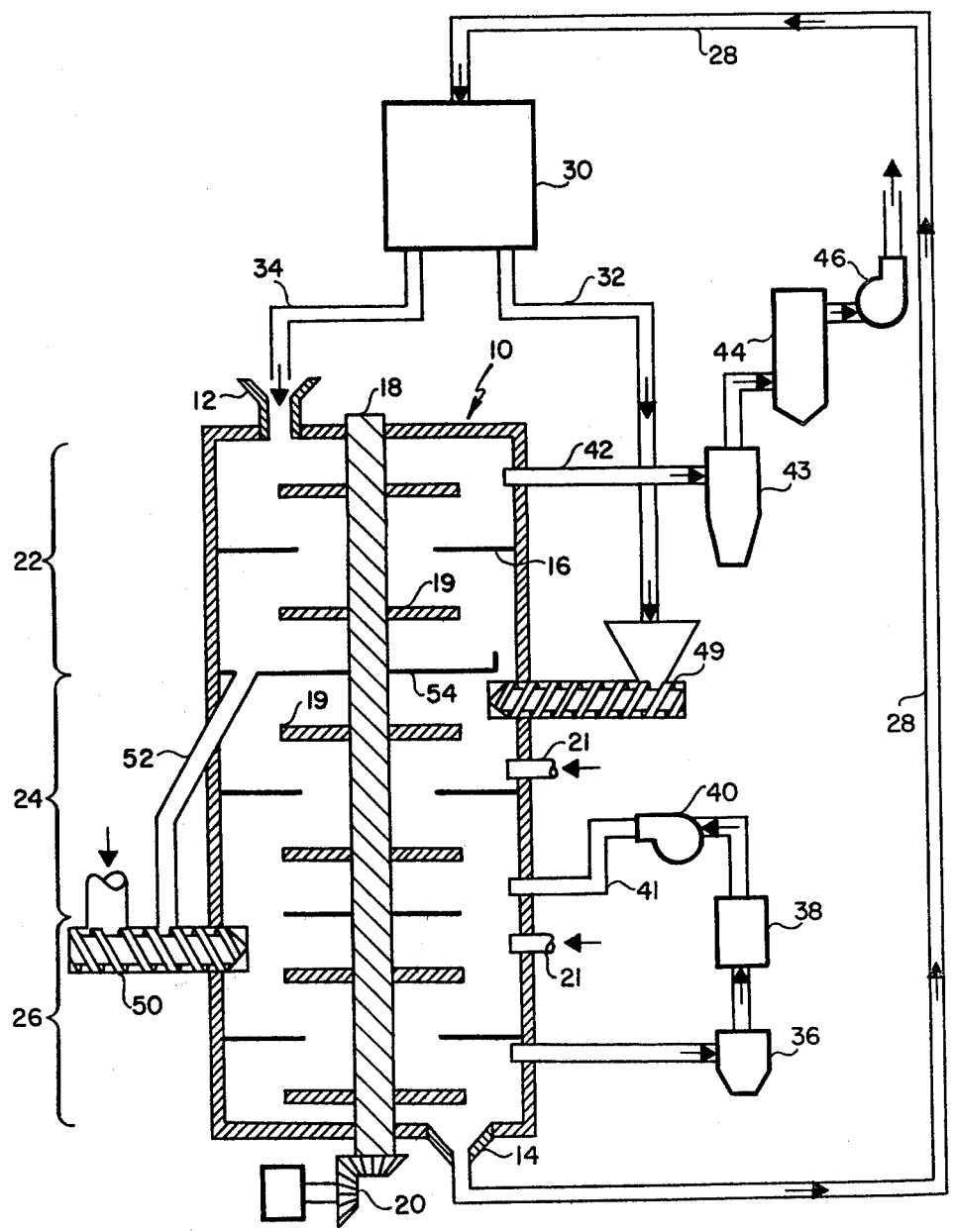
FIG. 2 is a schematic representation of another embodiment of the present system.

Referring now to FIG. 2, there is illustrated another embodiment of the present system. In this embodiment, many of the elements are the same as those in the FIG. 1 system, and like elements are numbered the same. The system shown in FIG. 2 differs from that shown in FIG. 1 in several respects. In particular the FIG. 2 system does not include a sludge storage container 31 but rather includes a screw conveyor 49. The screw conveyor 49 is a conventional device to contain material and transport the material at a controllable rate via a rotating helical member. Moreover, the FIG. 2 system includes a screw conveyor 50 coupled to the furnace to feed wet sludge into the lower zone 26. A conduit 52 is connected to the upper part of the screw conveyor 50 and to the hearth 54 which is lowest in the upper zone 22. The hearth 54 has a raised portion on its edge so that sand can exit the hearth 54 only via conduit 52. In operation wet sludge is introduced into the left end of the screw conveyor 50, hot sand from conduit 52 is mixed with the sludge near the middle of the screw conveyor, and the mixture is introduced into the lower zone 26.

Figure 3:
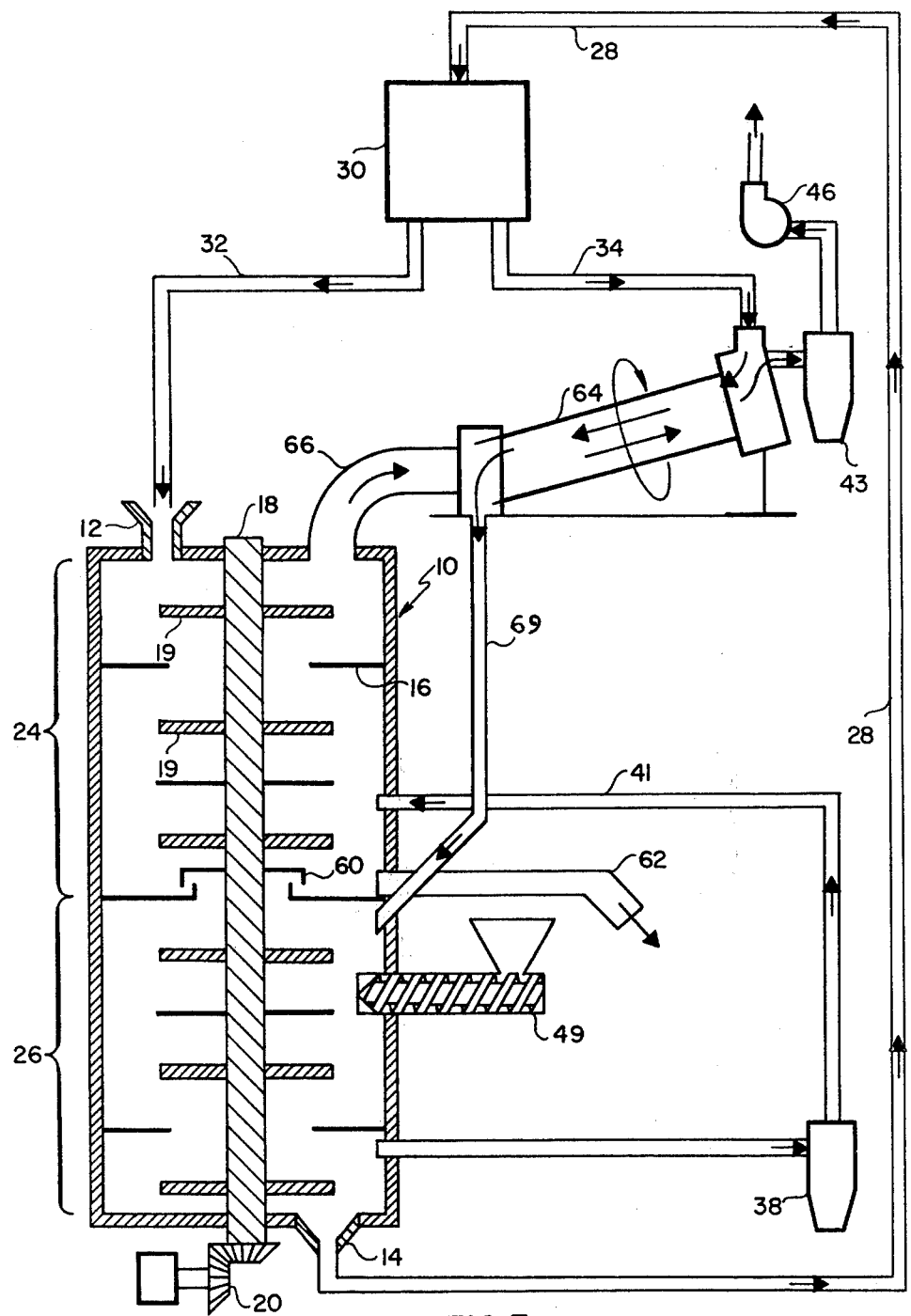
FIG. 3 is a schematic representation of still another embodiment of the present system.

Referring now to FIG. 3, there is illustrated another embodiment of the present system. In this embodiment many elements are the same as in the FIG. 2 system, and like elements are numbered the same. According to the FIG. 3 system the multiple-hearth furnace 10 includes a middle zone 24 and lower zone 26 but no zone equivalent to the upper zone 22 of the FIG. 2 system. A collar 60 is affixed to the center column 18 above the lowest hearth of the middle zone 24. The collar 60 is spaced apart from the hearth 16 to permit hot gases to rise from the lower zone 26 to the middle zone 24 and prevent ash from the burned sludge from falling between those two zones. The ash from the burned sludge is removed from the furnace 10 via conduit 62 and transferred to disposal.

A conventional rotary kiln 64 is coupled to receive hot gases exiting from the furnace via conduit 66. The rotary kiln 64 includes a substantially horizontally disposed, rotatable cylindrical vessel having an inlet at one end and an outlet at the other. A plurality of baffles are located within the vessel parallel to its axis, and the vessel is inclined slightly with its lower end at the outlet so that when the vessel is rotated, the sand cascades as it moves from the inlet to the outlet. A discharge breaching 68 is coupled to the outlet end of the kiln 64 so that hot sand leaving the kiln is transferred to conduit 69, and hot gases are conveyed into the kiln via conduit 66. The hot gases pass through the cascading sand thereby heating the sand. The conduit 69 is coupled to the lower zone 26 to convey the hot sand thereinto.

Figure 4:
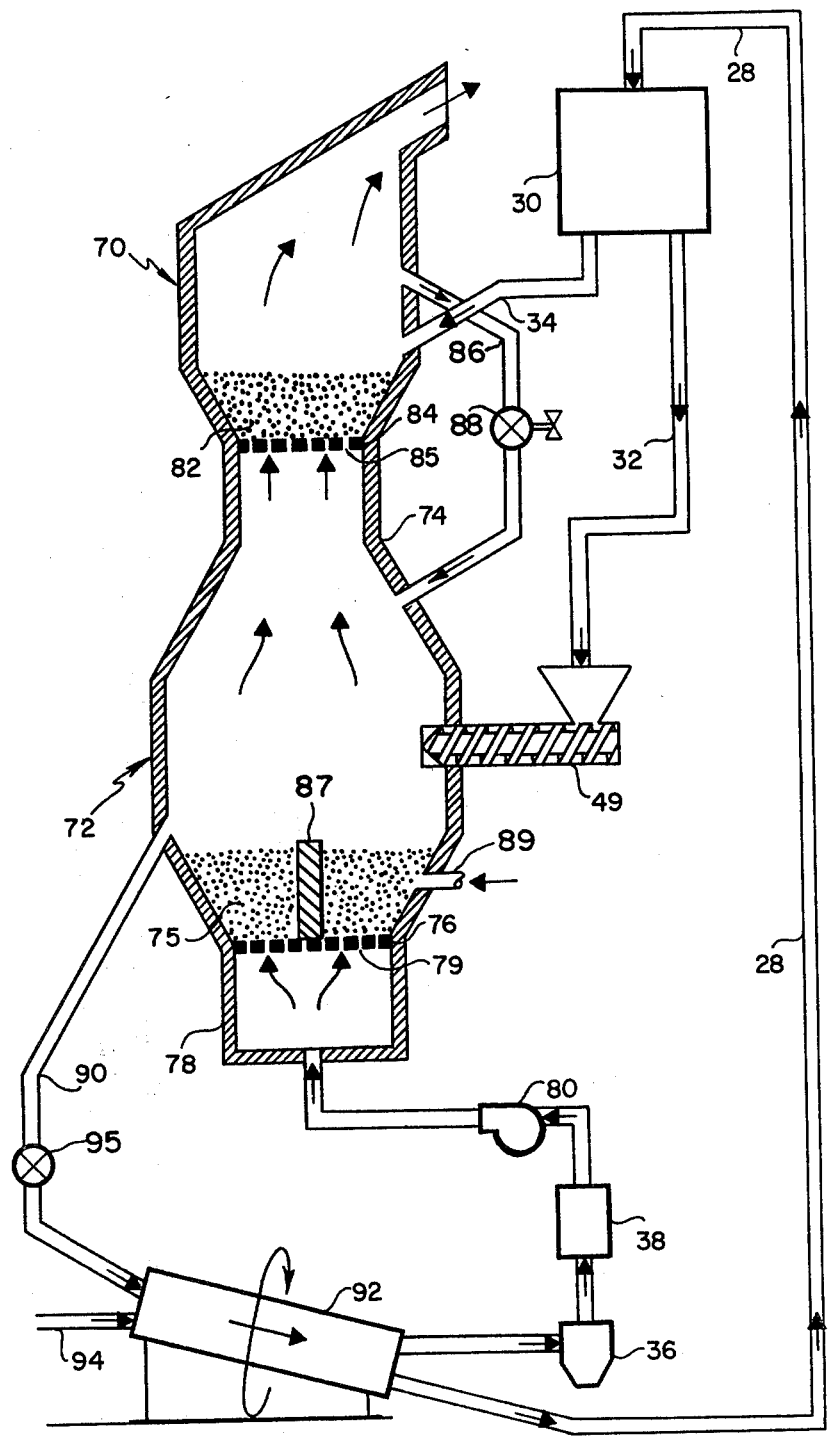
FIG. 4 is a schematic representation of still another embodiment of the present system.

Referring now to FIG. 4 there is illustrated another embodiment of the present system wherein elements which are common to the FIG. 2 system are numbered the same.

The FIG. 4 system includes two fluidized bed reactors 70 and 72. The lower reactor 72 includes a container 74 for containing a bed of solid particles 75 on a porous floor 76. The porous floor 76 contains a plurality of ports 79 which are large enough to permit the passage of gas but not the passage of the solid particles 75. A plenum chamber 78 is disposed below the floor 76 so that pressurized air introduced into the plenum chamber by blower 80 flows upward thereby fluidizing the particles. That is, the particles are separated from one another and agitated by the rising air thereby forming a so-called fluidized bed. The upper reactor 70 is disposed atop the lower reactor 72 so that the plenum chamber of the upper reactor 70 is, in effect, the upper part of the lower reactor 72. A second bed of particles 82 is maintained in the upper reactor 70 atop a porous floor 84 having ports 85. A wall 87 is affixed to the floor 76 and extends across the lower reactor 72 to separate the bed of particles 75 into two parts. The wall 87 extends a predetermined distance above the bed of particles 75 when the bed is not fluidized so that when the bed is fluidized a controllable quantity of particles flows from the right side to the left side of the wall 87. The sludge is introduced into the right part of the bed 75 so that it is substantially completely burned before leaving the reactor 72.

The construction of two fluidized bed reactors disposed one atop the other is conventional and, for example, the principle is taught in U.S. Pat. No. 2,638,684 to Jukkola. It should be understood that if the single upper reactor 70 does not heat the sand efficiently, one or more additional reactors can be disposed atop reactor 70 to heat the sand in stages.

In accordance with the FIG. 4 system a conduit 86 is coupled to transfer hot sand from the upper reactor 70 to the lower reactor 72, and a conventional rotary feeder 88 is interposed in the conduit 86 to allow sand to flow downward but prevent gas from traveling upward. The conduit 86 is affixed to the upper reactor 70 at a predetermined height relative to the bed of particles 82 so that only particles at a certain height above the porous floor 84 are conveyed by the conduit 86.

A burner 89 is coupled to the lower reactor 72 to burn fuel and the dry sludge in the fluidized bed of sand. A conduit 90 is coupled to the lower reactor 72 to convey hot sand to rotary kiln 92, and an air lock 95 is interposed in the conduit 90 to permit sand and ash to flow downward but to prevent the upward flow of gas. The rotary kiln 92 is substantially the same as the rotary kiln 64 illustrated in FIG. 3. A conduit 94 is coupled to the inlet end of the rotary kiln 92 for introducing wet sludge for mixing with the hot sand.

In operation sand is heated in the upper reactor 70 by hot gases rising from the lower reactor. The hot sand flows to the lower bed to mix with dry sludge on the right side of the wall 87 and the sludge is burned. The sludge is substantially burned on the right side of the wall 87, and primarily ash and sand flow over the wall and thence through the conduit 90. The hot sand then flows into the rotary kiln 92 to dry wet sludge, and the mixture of dry sludge and sand is transferred to the classifier 30 for separation.

It should be appreciated that although specific devices have been discussed above, other similar devices can be substituted therefor in accordance with conventional practice. It should also be appreciated that granular materials other than sand could also be utilized as a heat-transfer medium.

I claim:

1. A system to dry wet sludge with hot granular material and to burn the dry sludge comprising:
   a. heating means to heat the granular material;
   b. burning means coupled in gas flow communication with said heating means to burn dry sludge and to produce hot gases which are transferred to said heating means;
   c. drying means coupled in communication with said heating means to receive hot granular material from said heating means and to receive wet sludge and to mix the hot granular material with the wet sludge to dry the wet sludge;
   d. classifier means coupled to receive granular material and dry sludge from said drying means and to substantially separate the granular material from the dry sludge;
   e. transfer means coupled to said classifier means to convey the dry sludge to said burning means; and,
   f. second transfer means coupled to said classifier means to convey the granular material from said classifier means to said heating means.

2. A system according to claim 1 further including:
   a. purge air introduction means coupled to said drying means to introduce ambient air into said drying means; and,
   b. gas transfer means to convey gas from said drying means to said burning means.

3. A system according to claim 2 wherein said gas transfer means includes a condenser.

4. A system according to claim 1 wherein said heating means includes a first fluidized bed reactor, and said burning means includes a second fluidized bed reactor.

5. A system according to claim 4 further including first means to transfer the hot granular material from said first fluidized bed reactor to said second fluidized bed reactor and second means to transfer the hot granular material from said second fluidized bed reactor to said drying means.

6. A system to dry wet sludge with granular material and to burn dry sludge comprising:
   a. multiple hearth furnace means including,
      i. an upper zone to heat the granular material;
      ii. a middle zone to burn dry sludge to heat the granular material;
      iii. a lower zone to receive hot granular material and the wet sludge and to mix the hot granular material with the wet sludge to dry the wet sludge;
   b. classifier means coupled to receive granular material and dry sludge from said multiple hearth furnace means and to substantially separate the granular material from the dry sludge;
   c. transfer means coupled to said classifier means to convey the dry sludge to said middle zone means; and,
   d. second transfer means coupled to said classifier means to convey the granular material from said classifier means to said upper zone means.

7. A system according to claim 6 further including means to convey the hot granular material directly from said upper zone to said lower zone without passing through said middle zone.

8. A process for drying wet sludge with granular material and burning dry sludge comprising:
   a. introducing the granular material into a heating means;
   b. burning dry sludge in a burning means to produce hot gases;
   c. transferring the hot gases from the burning means to the heating means to heat the granular material;
   d. transferring the hot granular material and wet sludge to a drying means and mixing the hot granular material and wet sludge to substantially dry the wet sludge;
   e. transferring the mixture of granular material and substantially dry sludge to a classifier;
   f. in the classifier substantially separating the dry sludge from the granular material;
   g. transferring the dry sludge from the classifier to the burning means to be burned; and,
   h. transferring the granular material from the classifier to the heating means to be heated.

9. The process of claim 8 wherein the granular material is sand.

* * * * *